United States Patent Office 3,663,593
Patented May 16, 1972

3,663,593
FUNGICIDAL COMPOSITION
Hiroshi Takeda, Tokyo, Japan, and Walter H. Schuller and Ray V. Lawrence, Lake City, and Seymour S. Block, Gainesville, Fla., assignors to the United States of America as represented by the Secretary of Agriculture
No Drawing. Filed July 18, 1969, Ser. No. 843,225
Int. Cl. C07c 63/04, 69/76
U.S. Cl. 260—469     5 Claims

ABSTRACT OF THE DISCLOSURE

This invention relates to the formation of a new composition of matter, active as a fungicide. This product is prepared by heating either methyl levopimarate or a salt of levopimaric acid in the presence of a proton acceptor such as potassium hydroxide, sodium hydroxide, tris-n-butylamine, etc. and the resulting mixture ozonized and the ozonide oxidized by the method of King and Farber.

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of a new composition of matter which is active as a fungicide. This product is made by heating at about 200° C., methyl levopimarate or a salt of levopimaric acid in the presence of a proton acceptor such as potassium hydroxide, sodium hydroxide, tris-n-butylamine, etc. and the product cleaved by ozonolysis and subsequently oxidized with chlorine by the method of Schuller et al. J. Org. Chem. 27, 1178 (1962).

The reaction of methyl levopimarate and potassium levopimarate in the presence of a catalytic amount of potassium hydroxide has been described in the literature [Hiroshi Takeda, Walter H. Schuller, and Ray V, Lawrence, J. Org. Chem., 33, 3718 (1968) and J. Org. Chem., 34, 1459 (1969)]. The structures of the produtcs obtained are as follows:

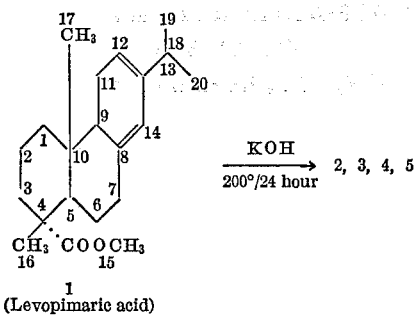

1
(Levopimaric acid)

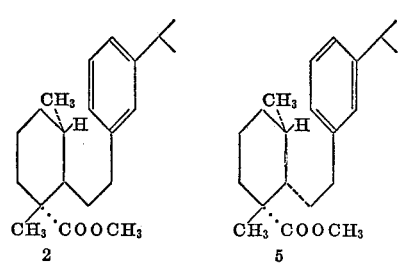

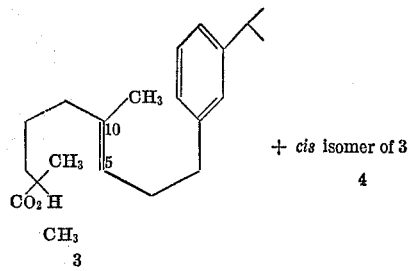

Compounds 3 and 4 on ozonization cleave the $C_5$–$C_{10}$ double bond and on oxidation of the ozonide, a ketone group forms at $C_{10}$ and a carboxylic group is formed at $C_5$.

The fact that a variety of hydrogen acceptors will cause the levopimarate ring structure to open up is shown by the fact that a tertiary amine such as tris-n-butylamine, as well as potassium and sodium hydroxide, will bring about the formation of 2, 3, 4, and 5 when reacted with methyl levopimarate at an elevated temperature. Temperatures in the range of 50°–250° C. are useful for this reaction; more specifically, a temperature around 190–220° C. is generally used.

The amount of excess base used in the reaction of methyl levopimarate or potassium levopimarate can be carried from 5 mole percent to 500 mole percent without any appreciable change in the results. In general, about 5–100 mole percent excess base, such as potassium hydroxide, is used. The proton acceptor functions as a catalyst and thus large excesses are not needed.

The test used for the determination of fungicidal activity is a standard one. Comparison of the test results with the well known antifungal agent dichlorophene shows our new composition of matter to be of comparable effectiveness.

EXAMPLE 1

An ether-methanol solution of methyl levopimarate (1) and 5 mole percent of potassium hydroxide was charged in equal portions to glass Carius tubes, the solvent removed under reduced pressure, and the tubes were sealed under nitrogen in vacuo and heated to 200° C. in an oil bath. Tubes were opened at intervals; the reaction was followed by gas-liquid chromatography (g.l.c.) on a 15 ft., 5 percent Versamid column on Chromosorb W at 250° C. The reaction was complete in 24 hours. Data are given as compound number (yield) (relative retention time based on methyl dehydroabietate as 1.0): 4 (6.2%) (0.428), 3 (30%) (0.481), 5 (14.6%) (0.518), 2 (22.9%) (0.555), methyl palustrate-methyl levopimarate ratio of 4:1 in peak (12%) (0.815) (peak collected and analyzed by $[a]_D{}^T$), methyl dehydroabietate (4.6%) (1.0), and methyl abietate (7.7%) (1.165). The yields are given on the portion which is volatile on the g.l.c. column. The total percent volatiles was 77%. The use of 15 mole percent potassium hydroxide for 48 hours at 200° C. gave essentially identical results. The crude mixture exhibited the following properties: $[a]_D{}^{25}$ —1.26° (C.=0.9 in 95% ethanol); ultraviolet absorption spectrum $\lambda_{max}^{EtOH}$ 240 m$\mu$ (a 7.5), m$\mu$ (a 6.4), 263 m$\mu$ (a 5.3), 271 m$\mu$ (a 4.7)

soluble in 95% ethanol, methanol, acetone; insoluble in water.

EXAMPLE 2

A mixture of levopimaric acid and 105 mole percent of potassium hydroxide was prepared in methanol-ether. The solution was charged to a large test tube and the solvent removed under vacuum. The run was carried out at 200° C. in the open glass tube (attached to a long rubber tube to prevent contamination by fumes from bath). After 3 days at 200° C. the mixture exhibited the following composition: 4 (1.1%) (0.428), 3 (4.2%) (0.481), 5 (24.8%) (0.518), 2 (9.6%) (0.555), levopimarate-palustrate (49.4%) (0.815), dehydroabietate (7.7%) (1.0) and abietate (3.2%) (1.165). The yields are based on the volatile portion of the sample; the crude material contained 62% volatile products. The mixtures of salts was regenerated by treating an ether suspension with dilute phosphoric acid. The mixture of free acids was esterified in ether solution with diazomethane.

EXAMPLE 3

Methyl levopimarate (1) (0.8 g.; 2.5 mmoles) was dissolved in tris-n-butylamine (10 ml.; 42 mmoles) and refluxed (216° C.). After refluxing 5 hours, ether was added, the solution washed twice with aqueous acetic acid and with water 5 times, dried and concentrated. The residue was analyzed by g.l.c.( Versamid 900); 4 (5.8%); mixture of 5 and 3 (19.1%), 2 (1.75%), levopimarate-palustrate peak (39.8%), dehydroabietate (19.5%), abietate (2.2%). The same composition was obtained on refluxing the sample for 10 hours.

EXAMPLE 4

The product from Example 1 (3 g.) was dissolved in 100 ml. of absolute methanol and the solution cooled to −70° C. The solution was treated with ozone until uptake ceased. Water (20 ml.) and ethanol (15 ml.) were added and the solution adjusted to 0° C. The reaction product, cleaved by ozonolysis was then oxidized by the addition of $Cl_2$ gas according to the method of W. H. Schuller, R. N. Moore, J. E. Hawkins, and R. V. Lawrence, J. Org. Chem., 27, 1178 (1962). The final solution was concentrated under strongly reduced pressure. The residue was dissolved in ether, washed with water, dried over sodium sulfate, and the solvent stripped off under reduced pressure. The dark brownish-black liquid exhibited the following properties: [α]$_D$ O(C.=0.8 in 95% ethanol); ultraviolet absorption spectrum, $$\lambda_{max.}^{EtOH} \ 274 \ m\mu \ (a \ 1.2), \ 283 \ m\mu \ (a \ 1.0)$$

soluble in 95% ethanol, methanol, and acetone; insoluble in water.

EXAMPLE 5

The product prepared in Example 4 was dissolved in acetone (1 g. per 9 ml.) and 0.01 ml. was applied to a small circular disc of adsorbent paper. The disc was placed on an agar growth medium seeded with a fungus. After incubation for a suitable period, depending on the organism, the zone of inhibition of growth of the organism on the agar surrounding the disc was recorded in millimeter. The fungi used were

*Penicillium expansum* (Pen), *Trichophyton mentagrophytes* (Tri) and *Aspergillus niger* (Asp).

The results are as follows, compared to the well-known fungicide, Dichlorophene.

| | Pen | Tri | Asp |
|---|---|---|---|
| Products from: | | | |
| Example 5 | 0.5 | 1.0 | 1.5 |
| Dichlorophene | 1.0 | 1.0 | 1.5 |

We claim:

1. A process for preparing a composition of matter effective as a fungicide comprising
   (a) heating a material selected from the group consisting of methyl levopimarate and an alkali metal salt of levopimaric acid in the presence of a proton acceptor selected from the group consisting of potassium hydroxide, sodium hydroxide, and tris-n-butylamine, at a temperature of about from 50° to 250° C.;
   (b) dissolving the product from step (a) in absolute methanol;
   (c) cooling the solution from step (b) to about −70° C.;
   (d) treating the cooled solution from step (c) with ozone until uptake ceases;
   (e) adding water and ethanol to the resulting ozonide from step (d) at about 0° C.;
   (f) oxidizing the reaction product from step (e) with $Cl_2$;
   (g) concentrating the solution from step (f);
   (h) dissolving the residue from step (g) in an inert solvent;
   (i) washing the solution from step (h) with water;
   (j) drying the solution from step (i); and
   (k) stripping off the solvent from step (j).

2. The process of claim 1 wherein the proton acceptor is potassium hydroxide.

3. The process of claim 1 wherein the proton acceptor is sodium hydroxide.

4. The process of claim 1 wherein the proton acceptor is tris-n-butylamine.

5. The product produced by the process of claim 1.

References Cited

Journal of Org. Chem., Ring et al., 26, 326 (1961).
Journal of Org. Chem., Takeda et al., 33, 3718 (1968).
Journal of Org. Chem., Schuller et al., 27, 1178 (1962).

LORRAINE A. WEINBERGER, Primary Examiner

R. S. WEISSBERG, Assistant Examiner

U.S. Cl. X.R.

260—483, 515 R, 523 R, 526 R; 424—308